United States Patent

Murakami et al.

[11] Patent Number: 5,418,676
[45] Date of Patent: May 23, 1995

[54] SELF-DIAGNOSING APPARATUS FOR BRUSHLESS MOTOR

[75] Inventors: Takashi Murakami; Kazuaki Fukuda, both of Furukawa, Japan

[73] Assignee: Alps Electric Co., Ltd., Tokyo, Japan

[21] Appl. No.: 78,784

[22] Filed: Jun. 17, 1993

[30] Foreign Application Priority Data

Jun. 24, 1992 [JP] Japan .................. 4-043916 U
Jul. 14, 1992 [JP] Japan .................. 4-049327 U

[51] Int. Cl.⁶ .................................................. H02H 7/08
[52] U.S. Cl. ...................................... 361/23; 361/30; 361/31; 361/33
[58] Field of Search ............... 361/31, 23, 33, 30, 361/90; 318/434

[56] References Cited

U.S. PATENT DOCUMENTS

| | | | |
|---|---|---|---|
| 4,441,136 | 4/1984 | Hampshire | 361/88 |
| 4,712,053 | 12/1987 | Numata | 318/663 |
| 4,925,765 | 2/1988 | Miller | 361/31 |
| 5,057,962 | 10/1991 | Alley et al. | 361/24 |
| 5,076,761 | 12/1991 | Krohn et al. | 417/18 |

*Primary Examiner*—A. D. Pellinen
*Assistant Examiner*—Sally C. Medley
*Attorney, Agent, or Firm*—Guy W. Shoup; Patrick T. Bever

[57] ABSTRACT

A self-diagnosing apparatus for a brushless motor which has a voltage detection circuit for detecting drive current to the brushless motor, and for outputting voltage at one of different levels corresponding to a short circuit condition, an open circuit condition and other conditions. When the output of the voltage detection circuit is at a high (H) level, a short circuit condition is determined, whereas when that output is at a low (L) level, an open circuit condition is determined. When the output of the voltage detection circuit is at a level intermediate between "H" and "L" levels, and simultaneously when the output voltage does not pulsate, a motor lock condition is determined.

2 Claims, 7 Drawing Sheets

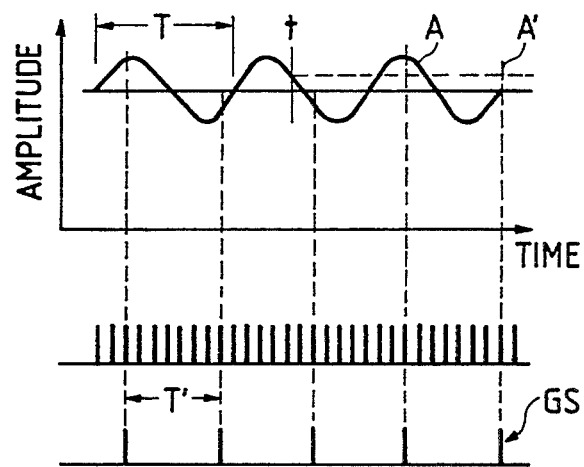
FIG. 2(a)
FIG. 2(b)
FIG. 2(c)
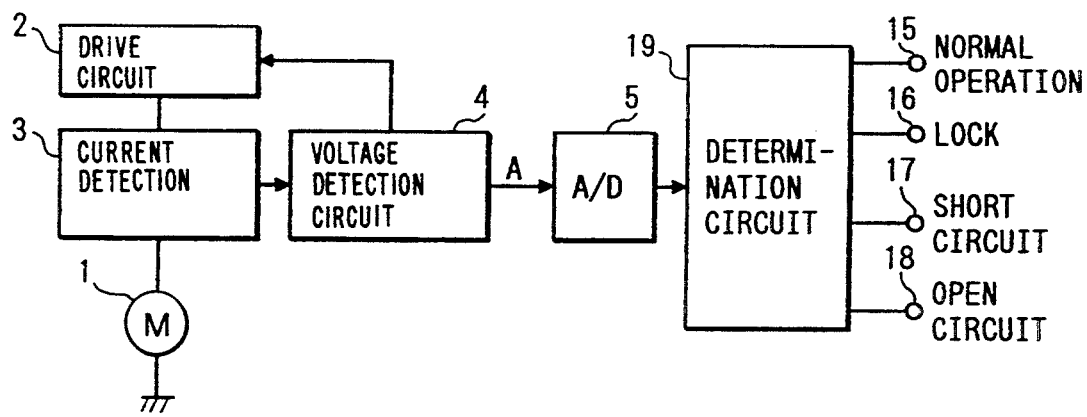
FIG. 3

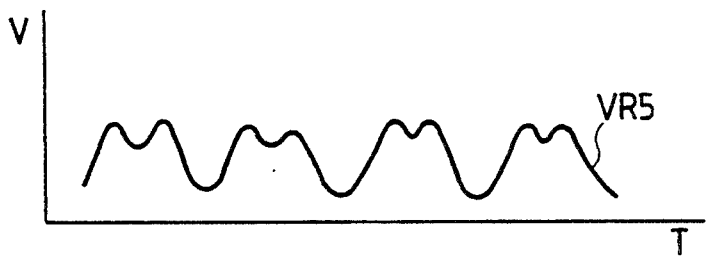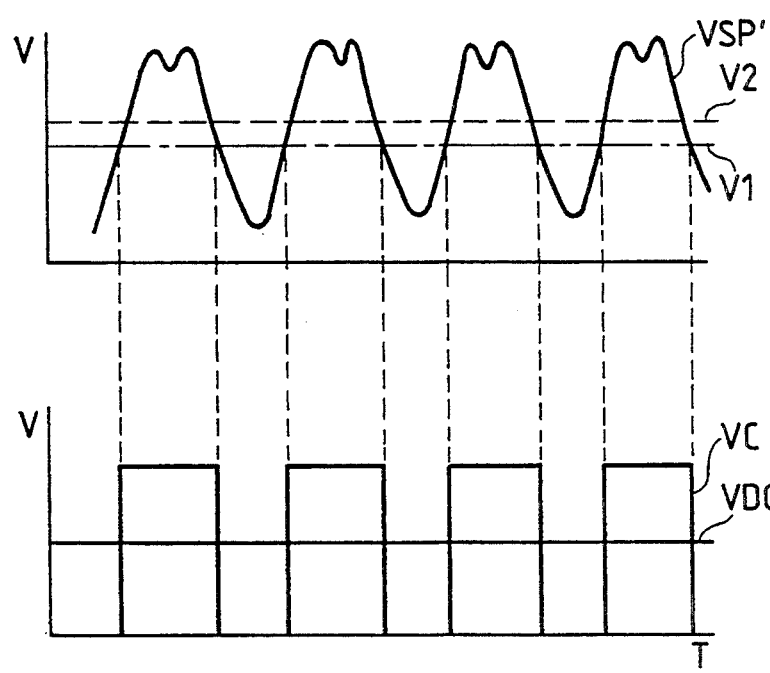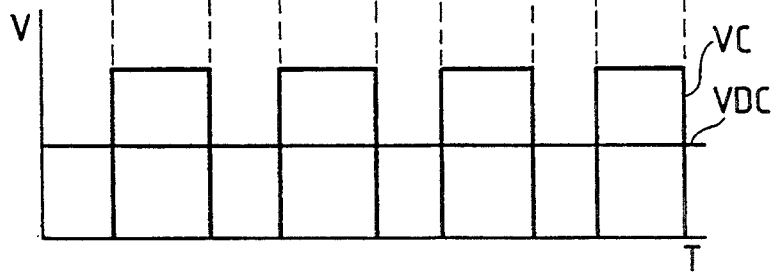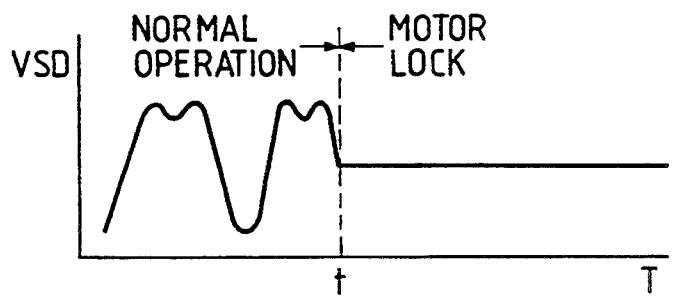

| VSD | VDC | CONDITION |
|---|---|---|
| 0~0.5 (V) | 0 (V) | OPEN CIRCUIT |
| 0.5~3.85 (V) | 0 (V) | MOTOR LOCK |
| | OTHER THAN 0 (V) | NORMAL OPERATION |
| 3.85~5.0 (V) | 0 (V) | SHORT CIRCUIT |

SELF-DIAGNOSING APPARATUS FOR BRUSHLESS MOTOR

BACKGROUND OF THE INVENTION

1. Field of the Invention

The present invention relates to a self-diagnosing apparatus for a brushless motor which may be used as a fan motor combined with a temperature sensor for sensing the temperature in a vehicle interior.

2. Description of the Related Art

An automatic air conditioner installed in the interior of a vehicle includes a temperature sensor for sensing the temperature in the vehicle interior. In order to increase the accuracy of interior temperature sensing by the temperature sensor, a fan is provided so that air in the interior of the vehicle can be blown toward the temperature sensor. Direct-current motors have hitherto been used as the motors for such fans. However, a brushless motor has come into use because it generates a low noise level and consumes a low level of electric power.

In actual use of a brushless motor, however, a fault may occur. For example, a short circuit or an open circuit may occur in the coil of the brushless motor or in the drive line for the brushless motor (the coil and the drive line will be generically referred to as "a motor line"). When such a fault occurs, the accuracy of sensing by the temperature sensor decreases, making it impossible for the automatic air conditioner to operate properly. Since a brushless motor generates only a low noise level during its operation, even if a fault, such as above, occurs resulting in an unwanted stoppage of the fan, the driver or passengers of the vehicle cannot be readily informed of the fault, particularly when driving the vehicle. For this reason, a self-diagnosing apparatus for the brushless motor is provided so that a fault, such as above, can be automatically detected and indicated.

FIG. 9 shows, in a block diagram, an example of a conventional self-diagnosing apparatus for a brushless motor. Reference numeral 1 denotes a brushless motor, and reference numeral 2 denotes a drive circuit. The apparatus includes a current detection section 3 and a voltage detection circuit 4.

Referring to FIG. 9, the brushless motor 1 is driven by drive current supplied from the drive circuit 2. The current detection section 3 detects drive current being supplied to the motor 1. On the basis of a detection of the current detection section 3, the voltage detection circuit 4 detects a condition of the motor line, and outputs a detection voltage signal A indicative of the detection. The detection voltage signal A has a high (H) level when the motor line is in a short circuit condition, and has a low (L) level when the motor line is in an open circuit condition. When the brushless motor 1 is in a normally operating condition, the signal A has a voltage x (V) at a level intermediate between "H" and "L" levels.

When the voltage detection circuit 4 has detected a short circuit condition of the motor line, the detection circuit 4 controls the drive circuit 2 in such a manner that no current will flow in the motor line. This operation is referred to as "short circuit protective control".

FIG. 10 is a circuit diagram showing a specific configuration of circuitry corresponding to such a conventional apparatus and a drive circuit. The circuitry includes resistors R1 to R10, transistors TR1 and TR2, diodes D1 to D4, and a comparator CP. Denoted by reference character ML is a motor line connected to a brushless motor, not shown. Reference numerals 2 to 4 denote circuits corresponding to those indicated by the same reference numerals in FIG. 9.

Referring to FIG. 10, when the brushless motor is normally operating, the transistor TR2 is turned on so that a certain bias voltage determined by the resistors R8 and R9 is applied to the base of the transistor TR1, and current IM is supplied to the brushless motor through the transistor TR1 and the resistor R1, the resistor R1 constituting the current detection section 3.

At this time, a voltage VRS, expressed by the following formula (1), is generated across the resistor R1:

$$VRS = R1 \times IM \qquad (1)$$

The voltage VRS is supplied to the voltage detection circuit 4, in which the resistors R2 to R5 cause the comparator CP to output a voltage VSD' expressed as follows:

$$VSD' = k \times VRS/(1-k) \qquad (2)$$

(where $k = R4/(R2+R4)$, R2 to R5 satisfying the relationship of $R2 = R3$ and $R4 = R5$)

If the resistors R6 and R7 satisfy the relationship of $R6 << R7$ and there is simultaneously a diode (diode 2) voltage VD, the voltage detection circuit 4 outputs a voltage VSD expressed as follows:

$$VSD = VSD' - VD \qquad (3)$$

Such a voltage VSD serves as the detection voltage signal A shown in FIG. 9. At the time being described, the diode D1 is forwardly biased and turned on so that the diode D3 is reversely biased and turned off. The diode D4 is also reversely biased and turned off.

When the motor line ML is in an open circuit condition, substantially no current IM flows through the resistor R1 constituting the current detection section 3 so that the voltage VRS across the resistor R1 (expressed by formula (1)) substantially equals 0 (VRS=0). Consequently, the voltage output from the voltage detecting circuit 4 (calculated by the formulae (2) and (3)) approximately equals 0 (VSD≈0). Thus, the signal A at a "L" level is obtained.

When the motor line ML is in a short circuit condition, the diode D4 is turned on, whereby the potential at point P becomes equal to the voltage VD of the diode D4. As a result, the transistor TR2 is turned off, and the transistor TR1, in which the bias voltage at its base increases, is also turned off. Consequently, the magnitude of current IM flowing in the motor line is brought to 0. This is the short circuit protective control.

The turning off of the transistor TR2 causes the diode D1 to be reversely biased and turned off. As a result, the output resistor 7, to which a line voltage E3 is supplied through the resistor R10 and the diode D3, causes the voltage detection circuit 4 to output a voltage VSD expressed as follows provided that the relationship of $R10 << R7$ stands:

$$VSD = E3 - VD \qquad (4)$$

Thus, the signal A at a "H" level is obtained. In formula (4), VD represents the voltage of the diode D3. At this time, the diode 2 is reversely biased and turned off.

If the circuitry operable as above is arranged such that the output voltage VSD expressed by the formula (3) is lower than the output voltage VSD expressed by the formula (4), it is possible to distinguish, on the basis of the magnitude of voltage VSD, each of a normally operating condition of the brushless motor, an open circuit condition of the motor line ML and a short circuit condition of the motor line ML from the others. An example of arrangement for this purpose will be described below.

In this example, it is assumed that E1=E3=+5 (V), E2=+12 (V), R8=470 (Ω), R9=1.8 (kΩ), R1=15 (Ω), and IM=30 (mA). In the voltage detection circuit 4, R2=R3=10 (kΩ), R4=R5=R7=47 (kΩ), R6=1 (kΩ), and R10=820 (Ω). It is also assumed that the diode voltage VD=0.6 (V).

Under the above assumption, voltage VSD during a normally operating condition of the brushless motor can be calculated from the formulae (1), (2) and (3) as follows: From formula (1), VRS=30 (mA)×15 (Ω)=450 (mA). Therefore, from formulae (2) and (3), $$VSD = 450 \text{ (mA)} \times (47/10) - 0.6 \text{ (V)} = 1.5 \text{ (V)}.$$

On the other hand, when the motor line ML is in a short circuit condition, from formula (4), $$VSD = 5 \text{ (V)} - 0.6 \text{ (V)} = 4.4 \text{ (V)}$$

Thus, voltage VSD during a short circuit condition is apparently greater than voltage VSD during a normal operation of the brushless motor.

The circuitry shown in FIG. 10 is combined with a determination circuit in which various voltage ranges, such as those shown in FIG. 11, are set. The determination circuit is arranged to determine within which of these ranges a voltage VSD output from the voltage detection circuit 4 falls, so as to determine a normally operating condition of the brushless motor, a short circuit condition of the motor line ML, or an open circuit condition of the motor line ML.

With the conventional-self-diagnosing apparatus, however, it has been impossible to determine a condition referred to as "a motor lock condition", in which the brushless motor becomes unable to rotate due, for instance, to the entrance of foreign matter. This is for the following reason: when the motor is in a locked condition, the magnitude of current IM flowing in the motor line ML is not so great as that of current which can flow in the motor line ML in a short circuit condition; as a result, a voltage VSD output from the voltage detection circuit 4 at this time falls within the same voltage range as output voltages VSD obtainable in a normally operating condition of the brushless motor.

SUMMARY OF THE INVENTION

The present invention is directed toward overcoming the above problem. An object of the present invention is to provide a self-diagnosing apparatus for a brushless motor that is capable of determining a motor lock condition as well as a normally operating condition of the brushless motor and short circuit and open circuit conditions of the motor line.

In order to achieve the above end, according to an aspect of the present invention, there is provided a self-diagnosing apparatus for a brushless motor, comprising voltage detecting means for detecting, as voltage, drive current to the brushless motor, and for outputting, from such detection voltage, voltage at one of different levels corresponding to a short circuit condition, an open circuit condition and other conditions. The apparatus further comprises: waveform shaping means for converting detection voltage into corresponding comparison voltage in which the direct-current component of the detection voltage is replaced with a fixed level lower than a reference voltage, for comparing the comparison voltage with the reference voltage, and for outputting voltage indicative of the comparison; smoothing means for smoothing voltage output by the waveform shaping means; and determining means for determining various conditions on the basis of the level of voltage output by the voltage detecting means and the level of voltage output by the smoothing means.

An apparatus according to the present invention may have the following arrangement: when a voltage detection circuit, serving as voltage detecting means, outputs voltage at a high (H) level, and when the circuit outputs voltage at a low (L) level, a short circuit condition and an open circuit condition are respectively determined. When the voltage detection circuit outputs voltage at neither "H" nor "L" level, the output voltage is sequentially sampled at a predetermined period or cycle, and sequential sample data are compared with each other. When the respective values of sequential sample data do not coincide with each other, the brushless motor is determined to be normally operating. On the other hand, when sequential sample data have values coincident with each other, the brushless motor is determined to be locked.

When a brushless motor is rotating, the drive current being supplied to the motor pulsates at a period corresponding to the number of magnetic poles and the number of revolutions per unit time of the rotor. However, when the motor is locked, the drive current keeps maintaining the same amplitude that the current has had immediately before the occurrence of the motor lock condition. Accordingly, voltage output by the voltage detecting means is such that the voltage pulsates at a certain period insofar as the brushless motor is normally operating, whereas, once a motor lock condition has occurred, the voltage becomes a direct-current voltage having a fixed magnitude. Thus, the voltage detecting means outputs pulsating voltage during a normally operating condition of the brushless motor, whereas the detecting means outputs direct-current voltage in other conditions including a motor lock condition.

The waveform shaping means, to which detection voltage from the detecting means is supplied, compares detection voltage with a reference voltage after the direct-current component of the detection voltage is replaced with a fixed level lower than the reference voltage level. With this construction, when supplied detection voltage is direct-current voltage, the waveform shaping means outputs voltage of 0 (V). Accordingly, the smoothing means also outputs voltage of 0 (V). On the other hand, when supplied detection voltage has a pulsating component, the waveform shaping means outputs voltage with a rectangular waveform. Accordingly, the smoothing means outputs voltage of other than 0 (V). Thus, the smoothing means outputs voltage of 0 (V) in a short circuit condition, in an open circuit condition, or in a motor lock condition, whereas the smoothing means outputs voltage other than 0 (V) in a normally operating condition of the motor.

As stated above, the voltage detecting means outputs voltage at a level falling within one of different ranges corresponding to a short circuit condition, an open circuit condition and other conditions. On the basis of voltage output by the voltage detecting means and voltage output by the smoothing means, therefore, it is possible to determine a particular condition among a short circuit condition, an open circuit condition, a motor lock condition and a normally operating condition of the brushless motor.

BRIEF DESCRIPTION OF THE DRAWINGS

FIGS. 2(a) to 2(c) show the principles employed in the embodiment shown in FIG. 1 for the detection of a motor lock condition;

FIG. 3 is a block diagram showing another embodiment of a self-diagnosing apparatus for a brushless motor according to the present invention;

FIGS. 6(a) to 6(c) show the waveform of voltages output from various parts of the embodiment shown in FIG. 5 when the brushless motor is in a normally operating condition;

FIG. 7 show a change in voltage waveform caused by the occurrence of motor lock condition in the embodiment shown in FIG. 5;

DESCRIPTION OF THE PREFERRED EMBODIMENTS

Embodiments of the present invention will now be described with reference to the accompanying drawings.

Figure 1:
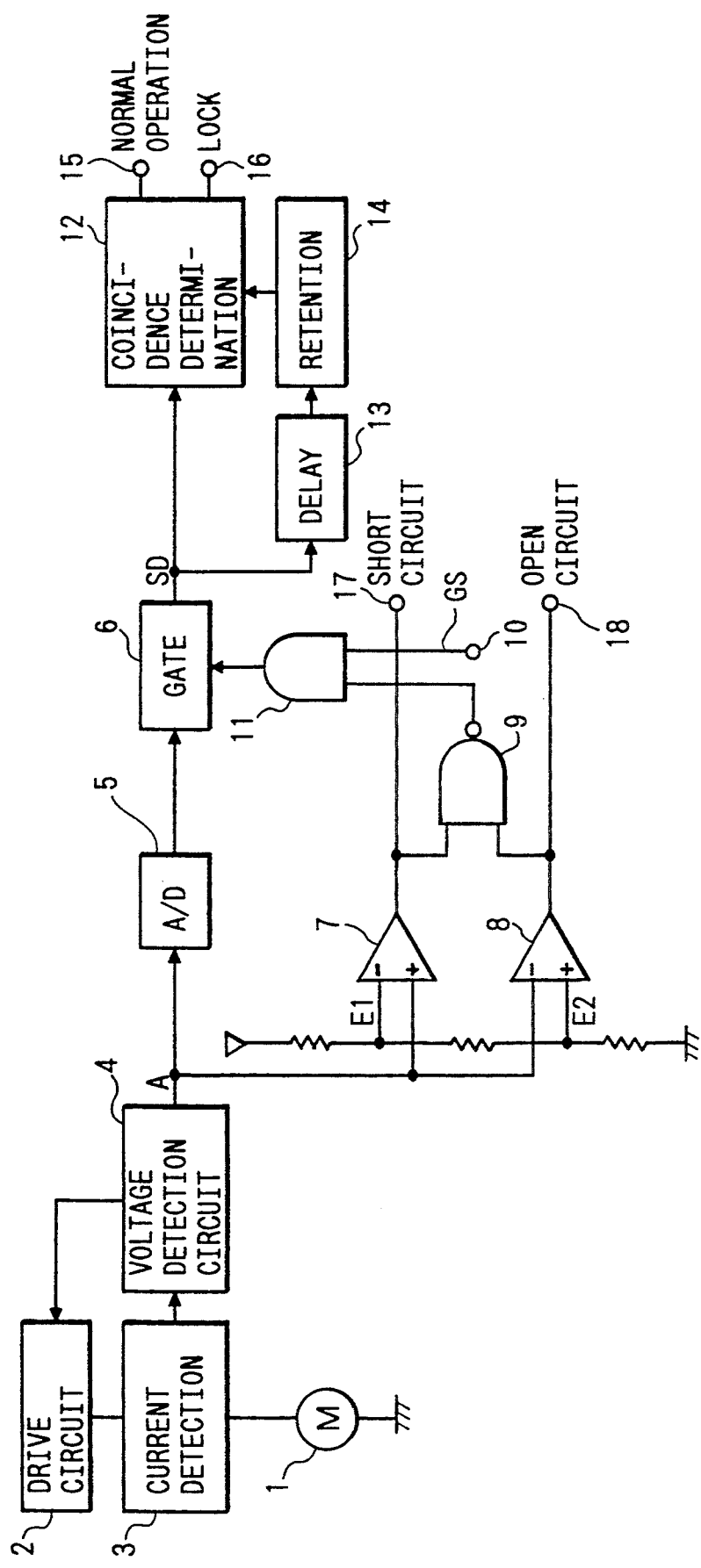
FIG. 1 is a block diagram showing an embodiment of a self-diagnosing apparatus for a brushless motor according to the present invention.
Figures 8, 9:
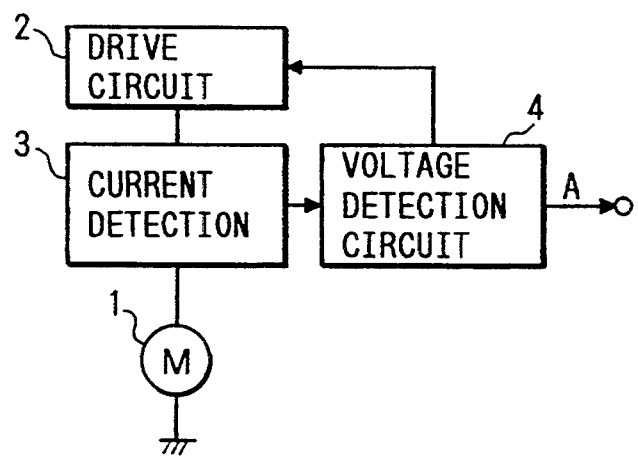
FIG. 8 is a chart showing an example of relationship on the basis of which a determination circuit of the embodiment shown in FIG. 5 makes determinations.
FIG. 9 is a block diagram showing a conventional self-diagnosing apparatus for a brushless motor.

Referring to FIG. 1, showing, in a block diagram, an embodiment of a self-diagnosing apparatus for a brushless motor according to the present invention, the apparatus has a current detection circuit 3 and a voltage detection circuit 4, and includes an analog/digital (A/D) conversion circuit 5, a gate circuit 6, a pair of comparison circuits 7 and 8, a NOR circuit 9, an input terminal 10, an AND gate 11, a coincidence determination circuit 12, a delay circuit 13, a retention circuit 14, and a plurality of output terminals 15 to 18. In FIG. 1, elements corresponding to the elements shown in FIG. 9 are denoted by identical reference numerals, and their description will be omitted to avoid redundancy.

Figure 11:
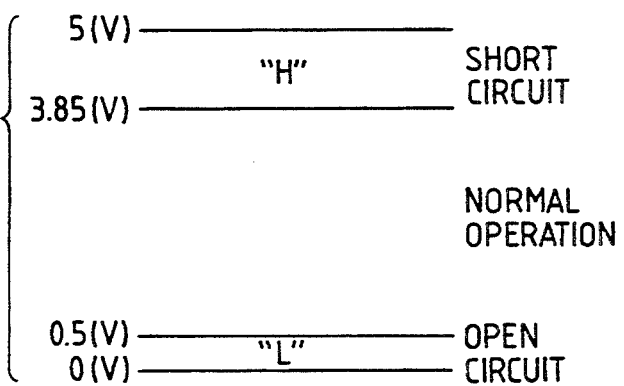
FIG. 11 shows various ranges used in the conventional apparatus shown in FIG. 10 to make determinations.

Referring to FIG. 1, a detection voltage signal A output from the voltage detection circuit 4 is supplied to the A/D conversion circuit 5, in which the signal A is converted into corresponding digital data (i.e., digitized), and is also supplied to the comparison circuits 7 and 8. In the comparison circuit 7, the detection voltage signal A is compared with a first reference voltage E1 and, when E1≦A, the comparison circuit 7 outputs a signal of a high (H) level; this is for the purpose of determining whether or not the level of the detection voltage signal A is within a high (H) level range, such as that shown in FIG. 11. A "H" signal of the comparison circuit 7 is obtained at the output terminal 17 when the motor line is in a short circuit condition. In the comparison circuit 8, the detection voltage signal A is compared with a second reference voltage E2 (E2<E1) and, when A≦E2, the comparison circuit 8 outputs a signal of a high (H) level; this is for the purpose of determining whether or not the level of the detection voltage signal A is within a low (L) level range, such as that shown in FIG. 11. A "H" signal of the comparison circuit 8 is obtained at the output terminal 18 when the motor line is in an open circuit condition.

When the motor line is neither short-circuited nor open-circuited, both comparison circuits 7 and 8 output "L" signals. Accordingly, the NOR circuit 9, to which these "L" signals are input, produce a "H" output. The "H" output of the NOR circuit 9 turns on the AND circuit 11 so that a gate signal GS, supplied from the input terminal 10 at a signal period described later, is passed through the AND gate 11, and delivered to the gate circuit 6.

The A/D conversion circuit 5 supplies sample data, obtained by digitizing the detection voltage signal A, to the gate circuit 6. Each time the gate circuit 6 receives the gate signal GS from the AND gate 11, the gate circuit 6 permits the passage therethrough of sample data supplied within a duration of the gate signal GS.

The gate signal GS will be described with reference to FIGS. 2(a) to 2(c).

When the brushless motor 1 is normally operating, drive current IM being supplied thereto pulsates at a period T corresponding to the number of poles and the number of revolutions per unit time of the rotor, as is understood from FIG. 6(a) (which shows changes in the voltage across the resistor R1 with the passage of time). Accordingly, the detection voltage signal A pulsates at a period T, as shown in FIG. 2(a). The detection voltage signal A is digitized by the A/D conversion circuit 5 in accordance with a sampling clock shown in FIG. 2(b). As shown in FIG. 2(c), the gate signal GS is in phase and in synchronization with the sampling clock, and has a period T' differing from the product of an integer and the pulsation period T of the detection voltage signal A.

With the gate signal GS, therefore, items of sample data SD sequentially output from the gate circuit 6 have mutually different values when the brushless motor 1 is normally operating and, accordingly, the detection voltage signal A is pulsating. In contrast, when a motor lock condition has occurred at, for instance, a time point t shown in FIG. 2(a), the motor lock causes the detection voltage signal A to maintain the same level that the signal A has had immediately before the time point t, whereby the signal A assumes a constant level, as indicated by broken line A' in FIG. 2(a). As a result, after the time point t, items of sample data SD sequentially output from the gate circuit 6 have an identical value.

Referring again to FIG. 1, each item of sample data SD output from the gate circuit 6 is supplied to a coincidence determination circuit 12, and is also supplied to a delay circuit 13. The delay circuit 13 delays the supplied sample data SD by a time appropriately shorter than the period T' of the gate signal GS at which the gate circuit 6 sequentially outputs items of sample data SD. The thus delayed sample data SD is retained by the retention circuit 14. The coincidence detection circuit 12 determines whether or not the latest item of sample data SD supplied from the gate circuit coincides with the item of sample data retained by the retention circuit 14. Since the sample data retained in the retention circuit 14 has been delayed by the delay circuit 13, the retained sample data is data belonging to the cycle immediately previous to the latest cycle. Thus, each time the coincidence determination circuit 12 is supplied with an item of sample data SD from the gate circuit 6, the determination circuit 12 compares the item of sample data SD just supplied with the item of sample data belonging to the cycle immediately previous to the latest cycle, and determines whether these items of data coincide with each other.

When the brushless motor 1 is normally operating, the values of no two adjacent items of sample data supplied to the coincidence determination circuit 12 coincide with each other. In this case, the determination circuit 12 outputs a "H" signal to the output terminal 15 to indicate the determination of a normal operating condition. On the other hand, when a motor lock condition has occurred, the values of two adjacent items of sample data supplied to the coincidence determination circuit 12 coincide with each other. In this case, the determination circuit 12 outputs a "H" signal to the output terminal 16 to indicate the determination of a motor lock condition.

In this way, with the above embodiment, it is possible to determine a motor lock condition in addition to short circuit and open circuit conditions of the motor line.

FIG. 3 shows, in a block diagram, another embodiment of a self-diagnosing apparatus for a brushless motor according to the present invention. This embodiment is distinguished in that it has a determination circuit 19. In FIG. 3, elements corresponding to those shown in FIG. 1 are denoted by identical reference numerals.

Referring to FIG. 3, the determination circuit 19 comprises a microcomputer. The A/D conversion circuit 5 obtains sample data by digitizing a detection voltage signal A. The determination circuit 19 inputs such sample data at a cycle corresponding to the period of a gate signal GS, similar to that in the embodiment shown in FIG. 1, and makes similar determinations as those in the embodiment shown in FIG. 1. The determination circuit 19 outputs a "H" signal to the output terminals 15, 16, 17 and 18 when the brushless motor 1 is normally operating, when the motor is in a locked condition, when the motor line is in a short circuit condition, and the motor line is in an open circuit condition, respectively.

Figure 4:
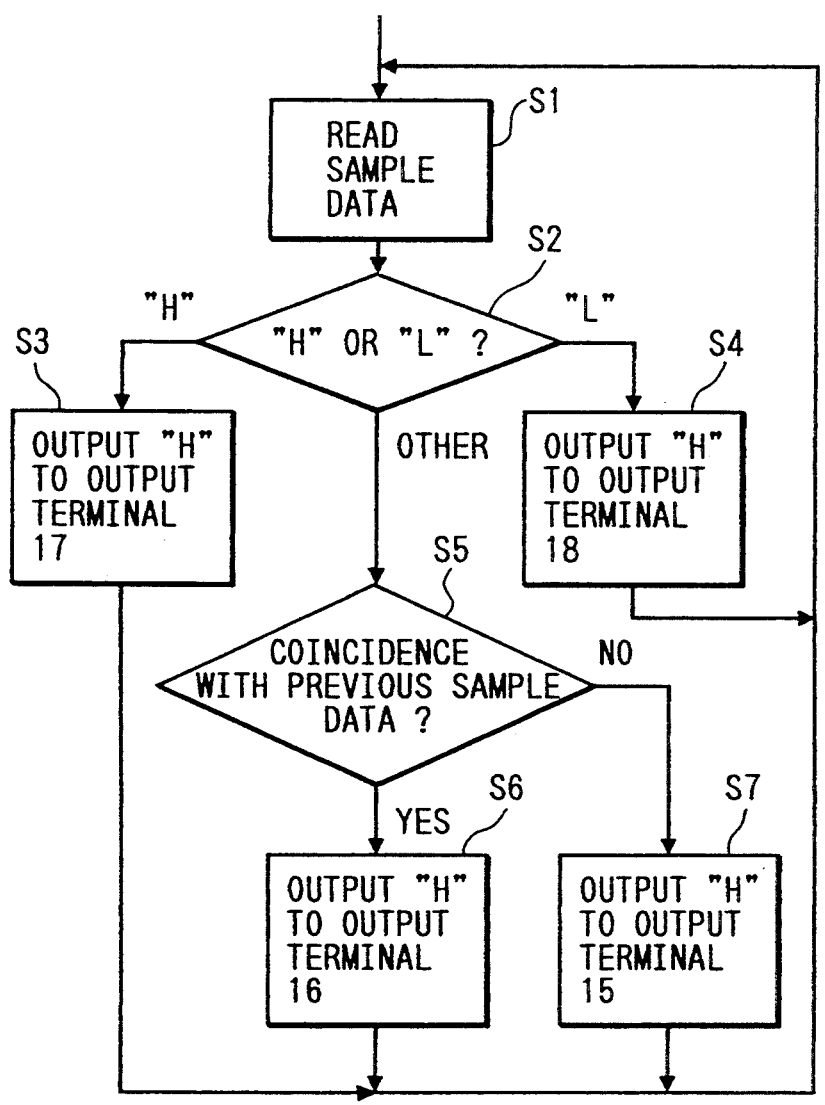
FIG. 4 is flowchart showing the operation of a determination circuit of the embodiment shown in FIG. 3.

The operation of the determination circuit 19 will be described with reference to FIG. 4.

An item of sample data is input from the A/D conversion circuit 5 (Step S1). In Step S2, determination is made concerning within which of a plurality of voltage ranges the value of the input item of sample data falls (the voltage ranges comprising, as those shown in FIG. 11, a "H" range, a "L" range and an intermediate range). When the item of sample data has a value falling within the "H" range, the circuit 19 outputs a "H" signal to the output terminal 17 (Step S3) to indicate a short circuit condition. When the item of sample data has a value falling within the "L" range, the circuit 19 outputs a "H" signal to the output terminal 18 (Step S4) to indicate an open circuit condition.

If the input item of sample data falls within neither the "H" nor "L" range, that item of sample data is compared with the item of sample data input in the immediately previous cycle (Step S5). If these items of sample data have values coincident with each other, a "H" signal is output to the output terminal 16 (Step S6) to indicate a motor lock condition. If the values of the compared items of sample data are not coincident with each other, a "H" signal is output to the output terminal 15 (Step S7) to indicate a normally operating condition of the brushless motor 1.

In this way, this embodiment also makes it possible to determine a motor lock condition in addition to short circuit and open circuit conditions.

In the above-described embodiments, a plurality of output terminals are provided for the indication of different conditions, and a "H" signal is output to one of the terminals to indicate the determination of a particular condition among a short circuit condition, an open circuit condition, a motor lock condition and a motor normally operating condition. However, this is a mere example, and the present invention is not limited thereto. Alternatively, only one output terminal may be provided and a signal, which is at one of different levels corresponding to the above conditions and which is thus indicative of the determination of a particular condition, may be obtained at the single terminal. Further, the voltage detection circuit 4 may alternatively be arranged such that it outputs a "L" signal in a short circuit condition and outputs a "H" signal in an open circuit condition.

Still another embodiment of the present invention will be described with reference to FIG. 5 et seq.

Figure 5:
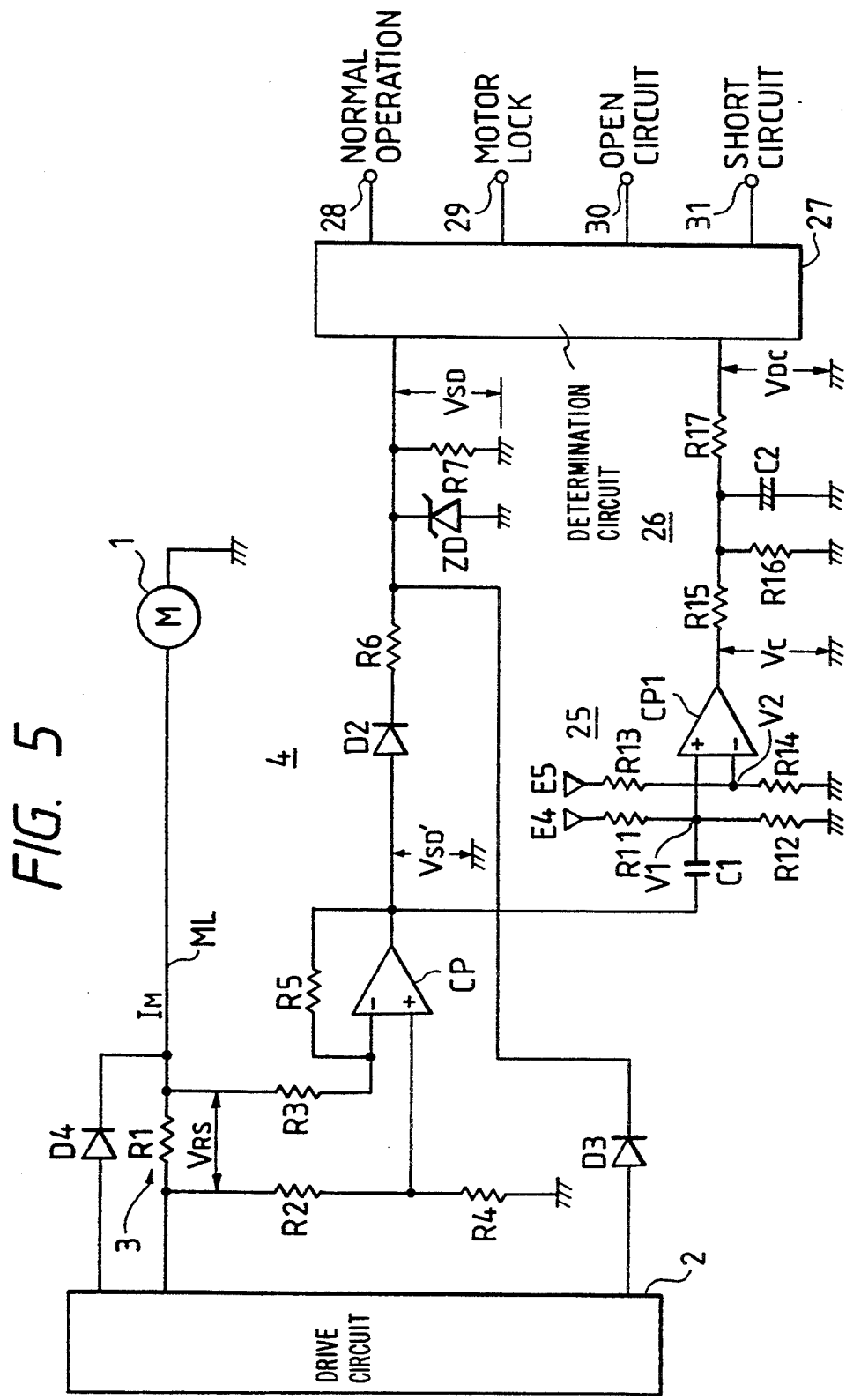
FIG. 5 is a circuit diagram showing still another embodiment of a self-diagnosing apparatus for a brushless motor according to the present invention.

FIG. 5 shows the construction of still another embodiment of a self-diagnosing apparatus for a brushless motor according to the present invention. The apparatus includes a waveform shaping circuit 25, a smoothing circuit 26, a determination circuit 27, output terminals 28 to 31, resistors R11 to R17, capacitors C1 and C2, and a comparator CP1. Elements corresponding to the elements shown in FIG. 10 are denoted by identical reference numerals and reference characters, and their description will be omitted to avoid redundancy.

Figure 10:
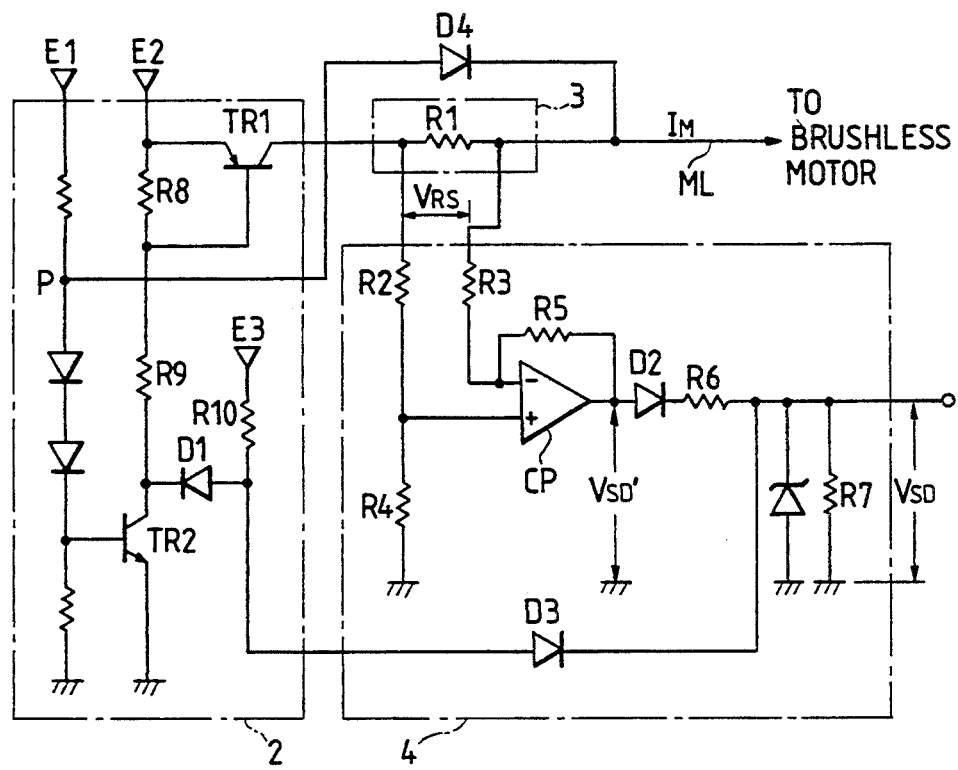
FIG. 10 is a circuit diagram showing a specific configuration of the conventional apparatus shown in FIG. 9.

Referring to FIG. 5, the circuit configuration of the embodiment is distinguished from that of the conventional apparatus shown in FIG. 10 in that the waveform shaping circuit 25, the smoothing circuit 26 and the determination circuit 27 are added. The determination circuit 27 is arranged to determine, on the basis of voltage VSD output from the voltage detection circuit 4 and voltage VDC obtained from the combination of the waveform circuit 25 and the smoothing circuit 26, a motor lock condition in addition to short circuit and open circuit conditions of the motor line ML and a normally operating condition of the brushless motor 1.

The comparator CP of the voltage detection circuit 4 outputs voltage VSD', which is supplied to produce output voltage VSD of the detection circuit 4, and which is also supplied to the waveform shaping circuit 25. In the waveform shaping circuit 25, a capacitor C1 removes the direct-current component of the voltage VSD' therefrom. Then, a direct-current voltage V1 obtained by dividing a line voltage E4 between the resistors R11 and R12 ($V1 = E4 \times R12/(R11+R12)$) is superimposed on the remaining component of the voltage VSD', thereby obtaining a comparison voltage. The comparison voltage is compared by the comparator CP1 with a reference voltage V2 obtained by dividing another line voltage E5 between the resistors R13 and R14 (V2=E5×R14/(R13+R14)). As shown in FIG. 6(b), the direct-current voltage V1 and the reference voltage V2 satisfy the relationship of V2>V1. The comparator CP1 outputs voltage DC which is at a high (H) level when the comparison voltage ≧V2, and which is at a low (L) level, that is, VC=0 (V), when the comparison voltage<V2. The voltage VC output by the comparator CP1 is supplied through the resistor R15 to the smoothing circuit 26 comprising the resistor 16 and the capacitor C2. In the smoothing circuit 26, the voltage VC is smoothed.

When the motor line ML is in an open circuit condition or when the line ML is in a short circuit condition, the voltage VSD' output from the comparator CP comprises a direct-current voltage. When the brushless motor 1 is normally operating, drive current IM pulsates at a period corresponding to the number of magnetic poles and the number of revolutions per unit time of the rotor. As a result, the voltage VRS across the resistor R1 pulsates, and so does the voltage VSD' output by the comparator CP, as respectively shown in FIGS. 6(a) and 6(b). However, when the motor 1 is brought from a normally operating condition into a motor lock condition, the drive current IM becomes a direct current, and this current has the same magnitude that the current IM has had at the time point of shift to the motor lock condition. As shown in FIG. 7, when a shift to a motor lock condition occurs at a time point t, the voltage VSD' output from the comparator CP becomes a direct-current voltage, this voltage having the same magnitude that the voltage VSD' has had immediately before the time point t.

When either an open circuit condition or a short circuit condition has occurred in the motor line ML, or when a motor lock condition has occurred, direct-current voltage VSD' is supplied from the comparator CP to the waveform shaping circuit 25. The capacitor C1 of the circuit 25 removes the direct-current voltage VSD' and, instead of this voltage VSD', the direct-current voltage V1 obtained by the resistors R11 and R12 is compared with the reference voltage V2 by the comparator CP1. Since V1<V2, the CP1 outputs a voltage VC of 0 (V). As a result, the smoothing circuit 26 also outputs a voltage VDC of 0 (V).

On the other hand, when the brushless motor 1 is normally operating, voltage VSD' output by the comparator CP comprises, as shown in FIG. 6(b), pulsating voltage. In the waveform shaping circuit 25, this voltage VSD' is converted, by the use of the capacitor C1 and the direct-current voltage V1, into pulsating voltage having a direct-current level of V1, and then compared by the comparator CP1 with the reference voltage V2. As a result, the CP1 outputs voltage VC comprising, as shown in FIG. 6(c), a voltage of a rectangular waveform having the same period as the above pulsation. The voltage VC is smoothed by the smoothing circuit 26, thereby obtaining a direct-current voltage VDC at a level other than 0 (V).

Thus, voltage VDC output by the smoothing circuit 26 has one of different magnitudes corresponding to a normally operating condition of the brushless motor 1 and other conditions, that is, a short circuit condition, an open circuit condition and a motor lock condition. In the above embodiment, voltage VSD obtained at the resistor R7 has a magnitude falling within one of different ranges (such as those shown in FIG. 11) corresponding to a short circuit condition, a normally operating condition and an open circuit condition. In a motor lock condition, the voltage VSD falls within the voltage range corresponding to a normal operating condition. The relationship between the voltages VSD and VDC, on one hand, and various conditions, on the other, is summarized in FIG. 8.

The determination circuit 27 inputs voltages VSD and VDC, and diagnoses the motor/motor fine condition on the basis of the relationship shown in FIG. 8. When the circuit 27 determines that the brushless motor 1 is normally operating, a signal of a certain level, for example, a "H" signal, is output to the output terminal 28. Similarly, such a signal is output to the output terminal 29, the output terminal 30 and the output terminal 31 when a motor lock condition is determined, when an open circuit condition is determined, and when a short circuit condition is determined, respectively. An indication device, such as a display device, not shown, is operated accordingly.

In this way, the above embodiment also makes it possible to distinguish between a normally operating condition and a locked condition of the brushless motor 1, so that it is possible to determine and indicate these conditions as well as open circuit and short circuit conditions of the motor line ML.

In the above embodiment, the determination circuit 27 may comprise a suitable microcomputer.

Although the foregoing embodiments have been described by using various values, these are mere examples, and the present invention is not intended to be limited by these values.

As has been described above, the present invention makes it possible to distinguish between a normally operating condition of a brushless motor and a motor lock condition. Therefore, it is possible to determine a fault condition among various fault conditions including a motor lock condition in addition to short circuit and open circuit conditions of the motor line.

What is claimed is:

1. The self-diagnosing apparatus for detecting an operating condition of a brushless motor and for generating motor control signals in response to the detected operating condition, the apparatus comprising:

voltage detecting means for detecting a drive voltage applied to said brushless motor and for generating an analog signal in response to the detected drive voltage;

comparison means for comparing an alternating-current component of the analog signal with a reference voltage, and for generating a direct-current voltage signal which is equal to a first voltage value when the alternating-current component is greater than the reference voltage, and a second voltage value when the alternating-current component is less than the reference voltage; and signal generating means, having a terminal connected to receive the direct-current voltage signal, for generating a motor lock control signal when the direct-current voltage signal remains at a constant voltage level for a predetermined amount of time;

wherein the voltage detecting means comprises a resistor having a first terminal and a second terminal, and wherein the apparatus further comprises:

a comparator connected between the voltage detecting means and the comparison means, the comparator having a non-inverting input connected to the first terminal and an inverting input terminal connected to the second terminal, the comparator having an output terminal connected to the comparison means;

wherein the output terminal of the comparator is connected to a second input terminal of the signal generating means.

2. The self-diagnosing apparatus of claim 1 wherein the comparison means comprises:

a capacitor having a first terminal and a second terminal, the first terminal being connected to the output terminal of the comparator;

a second comparator having a non-inverting input connected to the second terminal and to a first reference voltage, an inverting input terminal connected to a second reference voltage, and an output terminal connected to the signal generating means.

* * * * *